(12) United States Patent
Kim

(10) Patent No.: US 12,056,047 B2
(45) Date of Patent: Aug. 6, 2024

(54) MEMORY SYSTEM, MEMORY CONTROLLER AND OPERATING METHOD THEREOF FOR DETERMINING GARBAGE COLLECTION VICTIM BLOCK

(71) Applicant: SK hynix Inc., Icheon (KR)

(72) Inventor: Jung Woo Kim, Icheon (KR)

(73) Assignee: SK hynix Inc., Icheon (KR)

( * ) Notice: Subject to any disclaimer, the term of this patent is extended or adjusted under 35 U.S.C. 154(b) by 35 days.

(21) Appl. No.: 17/937,334

(22) Filed: Sep. 30, 2022

(65) Prior Publication Data

US 2023/0385193 A1 Nov. 30, 2023

(30) Foreign Application Priority Data

May 24, 2022 (KR) .................. 10-2022-0063709

(51) Int. Cl.
*G06F 12/02* (2006.01)
*G06F 13/16* (2006.01)

(52) U.S. Cl.
CPC ...... *G06F 12/0253* (2013.01); *G06F 12/0246* (2013.01); *G06F 13/1668* (2013.01)

(58) Field of Classification Search
CPC ............ G06F 12/0253; G06F 12/0246; G06F 13/1668; G06F 2212/7205
See application file for complete search history.

(56) References Cited

U.S. PATENT DOCUMENTS

| 8,799,561 | B2 | 8/2014 | Bux et al. | |
|---|---|---|---|---|
| 2013/0326118 | A1* | 12/2013 | Liao | G06F 12/0253 711/103 |
| 2014/0032817 | A1 | 1/2014 | Bux et al. | |
| 2017/0286288 | A1* | 10/2017 | Higgins | G06F 12/0246 |
| 2017/0357458 | A1* | 12/2017 | de Silva | G06F 3/064 |
| 2022/0100650 | A1* | 3/2022 | Lai | G06F 12/0253 |

FOREIGN PATENT DOCUMENTS

| KR | 1020160110596 A | 9/2016 |
|---|---|---|
| KR | 1020190078133 A | 7/2019 |

* cited by examiner

*Primary Examiner* — Tasnima Matin

(57) ABSTRACT

A memory system may include a memory device including a plurality of memory blocks each including a plurality of pages and a memory controller. The memory controller may be configured to determine a plurality of super memory blocks each including two or more of the plurality of memory blocks, calculate valid page counts of each of the plurality of super memory blocks, and determine a victim block for garbage collection based on a minimum value among the valid page counts of the plurality of super memory blocks and average value of the valid page counts of the plurality of super memory blocks. Furthermore, a dispersion of valid page counts of memory block groups within the super memory blocks may be used to determine the victim block.

16 Claims, 16 Drawing Sheets

# MEMORY SYSTEM, MEMORY CONTROLLER AND OPERATING METHOD THEREOF FOR DETERMINING GARBAGE COLLECTION VICTIM BLOCK

CROSS-REFERENCES TO RELATED APPLICATION

The present application claims priority under 35 U.S.C. 119(a) to Korean patent application number 10-2022-0063709 filed on May 24, 2022, which is incorporated herein by reference in its entirety.

TECHNICAL FIELD

Embodiments of the present disclosure relate to a memory system, a memory controller, and an operating method of the memory system for determining a garbage collection victim block.

BACKGROUND

A memory system includes a data storage device (i.e., a memory device) that stores data on the basis of a request from a host such as a computer, server, smartphone, tablet PC, or other electronic device. Examples of memory systems span from a traditional magnetic-disk-based hard disk drive (HDD) to a semiconductor-based data storage device such as a solid state drive (SSD), a universal flash storage (UFS) device, or an embedded MMC (eMMC) device.

The memory system may further include a memory controller for controlling the memory device. The memory controller may receive a command from the host and, on the basis of the received command, may execute the command by controlling read, write, and/or erase operations on the memory devices in the memory system. The memory controller may be used to execute firmware operations for performing a logical operation for controlling such operations.

When the operation of writing data to the memory device is continuously performed, the size of a free space in which data can be written is decreased in the memory device. Accordingly, the memory system may perform a garbage collection operation in order to secure additional free space in which data can be written in the memory device.

In this case, the performance of the garbage collection operation may vary depending on how a victim block is determined. If it takes a lot of time to determine the victim block or to migrate valid data stored in the victim block to another block, the performance of the garbage collection operation may degrade.

SUMMARY

Embodiments of the present disclosure may provide a memory system, a memory controller, and an operating method thereof, capable of minimizing overhead that occurs in a process of determining a victim block for a garbage collection operation, and of determining the victim block for the garbage collection operation more efficiently.

In one aspect, embodiments of the present disclosure may provide a memory system comprising i) a memory device including a plurality of memory blocks each including a plurality of pages and ii) a memory controller configured to determine a plurality of super memory blocks each including two or more of the plurality of memory blocks, calculate valid page counts of the plurality of super memory blocks, and determine a victim block for garbage collection from among the plurality of super memory blocks, based on a minimum value among the valid page counts of the plurality of super memory blocks and an average value of the valid page counts of the plurality of super memory blocks.

In another aspect, embodiments of the present disclosure may provide a memory controller comprising i) a memory interface capable of communicating with a memory device including a plurality of memory blocks each including a plurality of pages, and ii) a control circuit configured to determine a plurality of super memory blocks each including two or more of the plurality of memory blocks, calculate valid page counts of the plurality of super memory blocks, and determine a victim block for garbage collection from among the plurality of super memory blocks, based on a minimum value among the valid page counts of the plurality of super memory blocks and an average value of the valid page counts of the plurality of super memory blocks.

In another aspect, embodiments of the present disclosure may provide an operating method of a memory system including a plurality of memory blocks, comprising determining a plurality of super memory blocks each including two or more of the plurality of memory blocks; calculating valid page counts of the plurality of super memory blocks; and determining a victim block for garbage collection from among the plurality of super memory blocks, based on a minimum value among the valid page counts of the plurality of super memory blocks and an average value of the valid page counts of the plurality of super memory blocks.

According to embodiments of the present disclosure, it is possible to minimize overhead that occurs in the process of determining victim block for the garbage collection operation, and determine the victim block for the garbage collection operation more efficiently.

DETAILED DESCRIPTION OF ILLUSTRATIVE EMBODIMENTS

Figure 1:
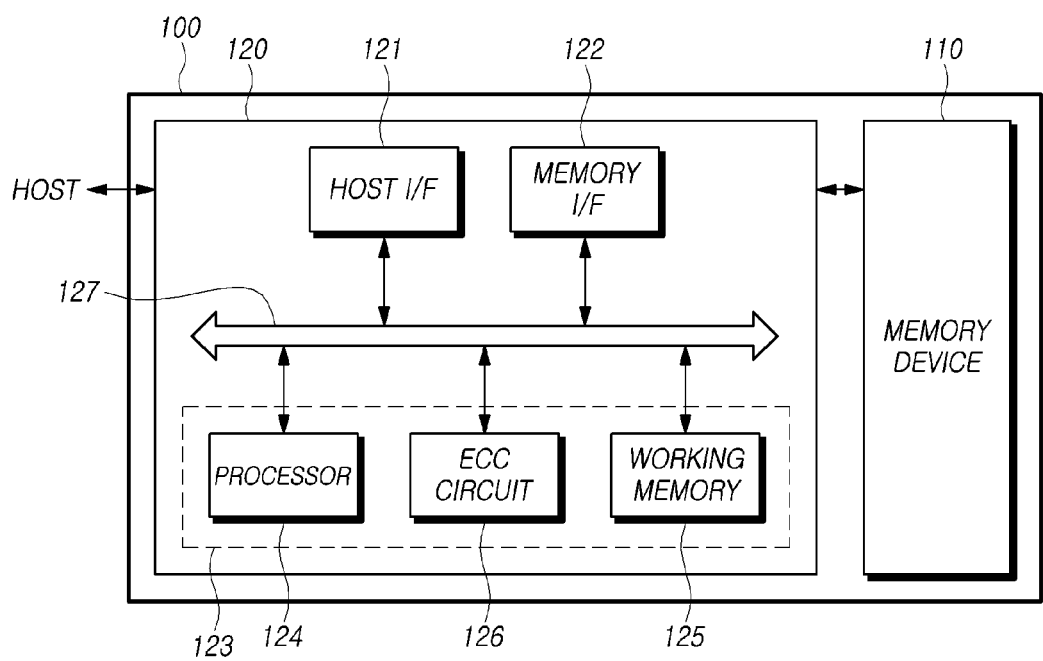
FIG. 1 is a schematic diagram illustrating a configuration of a memory system based on an embodiment of the disclosed technology.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings; however, that the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented in at least partially in software, the controllers, processors, devices, modules, units, multiplexers, generators, logic, interfaces, decoders, drivers and other signal generating and signal processing features may include, for example, a memory or other storage device for storing code or instructions to be executed, for example, by a computer, processor, microprocessor, controller, or other signal processing device.

FIG. 1 is a schematic diagram illustrating the configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation (also referred to as an "erase operation"), and the like.

The memory cells in the memory device 110 are used to store data and may be arranged in a memory cell array. The memory cell array may be divided into memory blocks of memory cells, and each memory block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in the absence of a request from the host when it performs background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface (memory I/F) 122, a control circuit 123, and a host interface (host I/F) 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In this patent document, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check as to whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
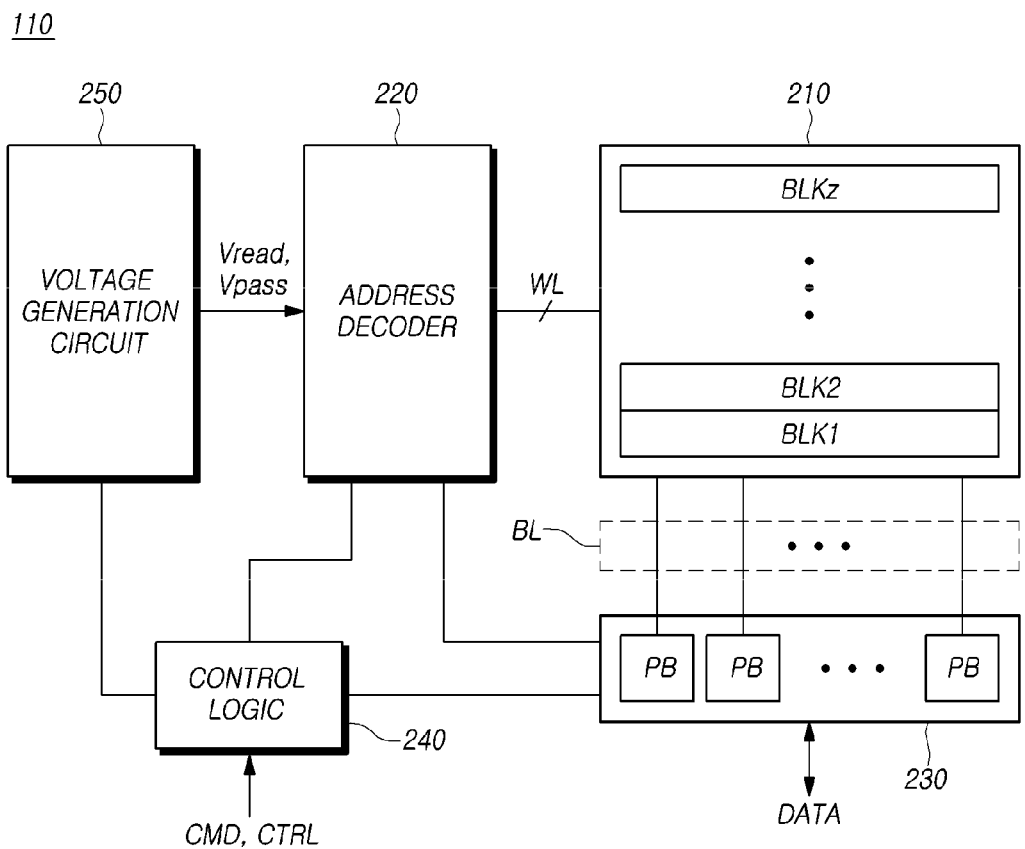
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. In an example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells. In some implementations, each memory cell may include a transistor that includes a material layer that can hold an electrical charge.

For example, the transistor included in each memory cell may include a drain, a source, and a gate. The drain (or source) of the transistor may be connected to the corresponding bit line BL directly or via another transistor. The source (or drain) of the transistor may be connected to the source line (which may be the ground) directly or via another transistor. The gate of the transistor may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
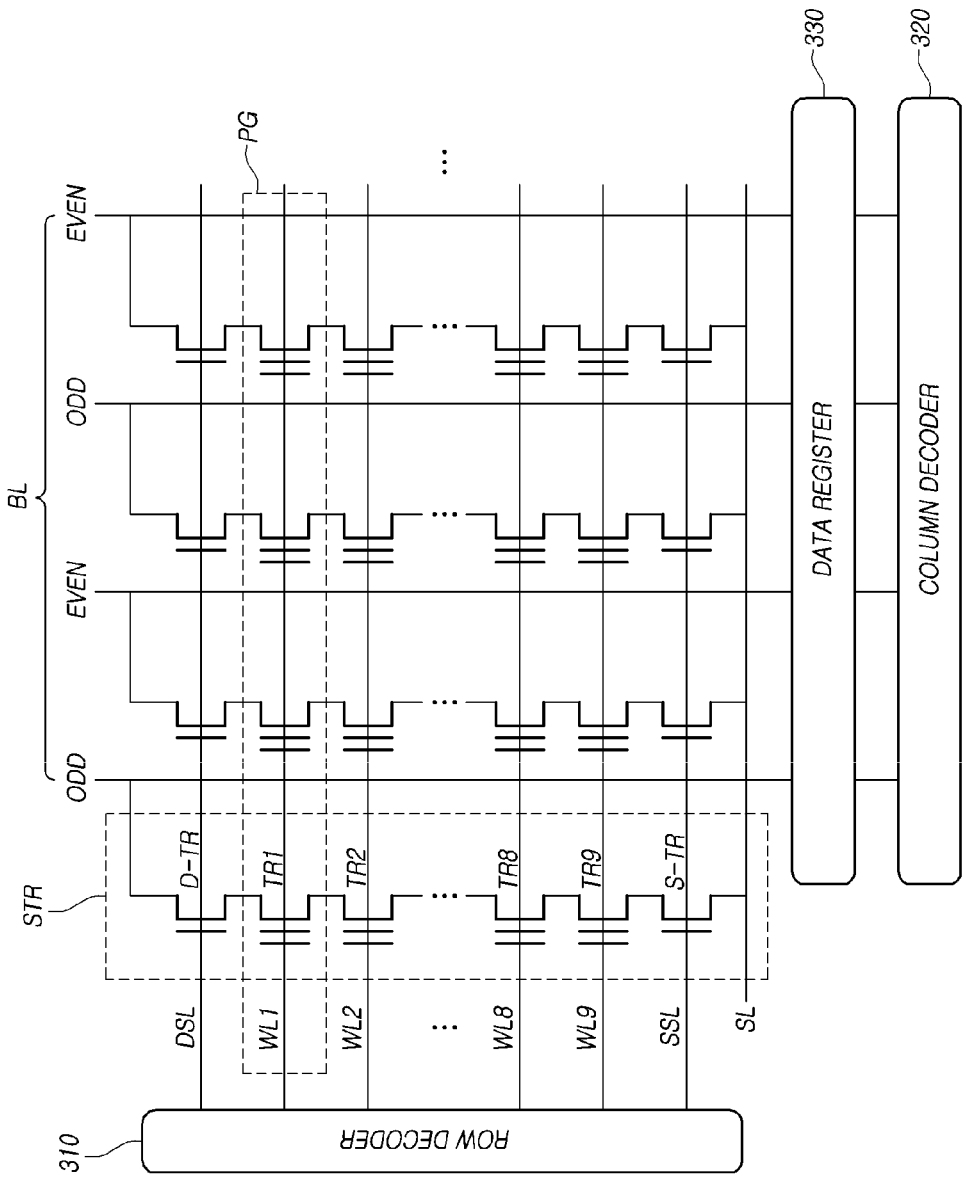
FIG. 3 is a diagram illustrating a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells are arranged, and an auxiliary area (the remaining area other than the core area) to include circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of odd-numbered bit line and even-numbered bit line is coupled in common to a column decoder 320.

In accessing a memory cell, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to respective memory cells. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch circuit that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
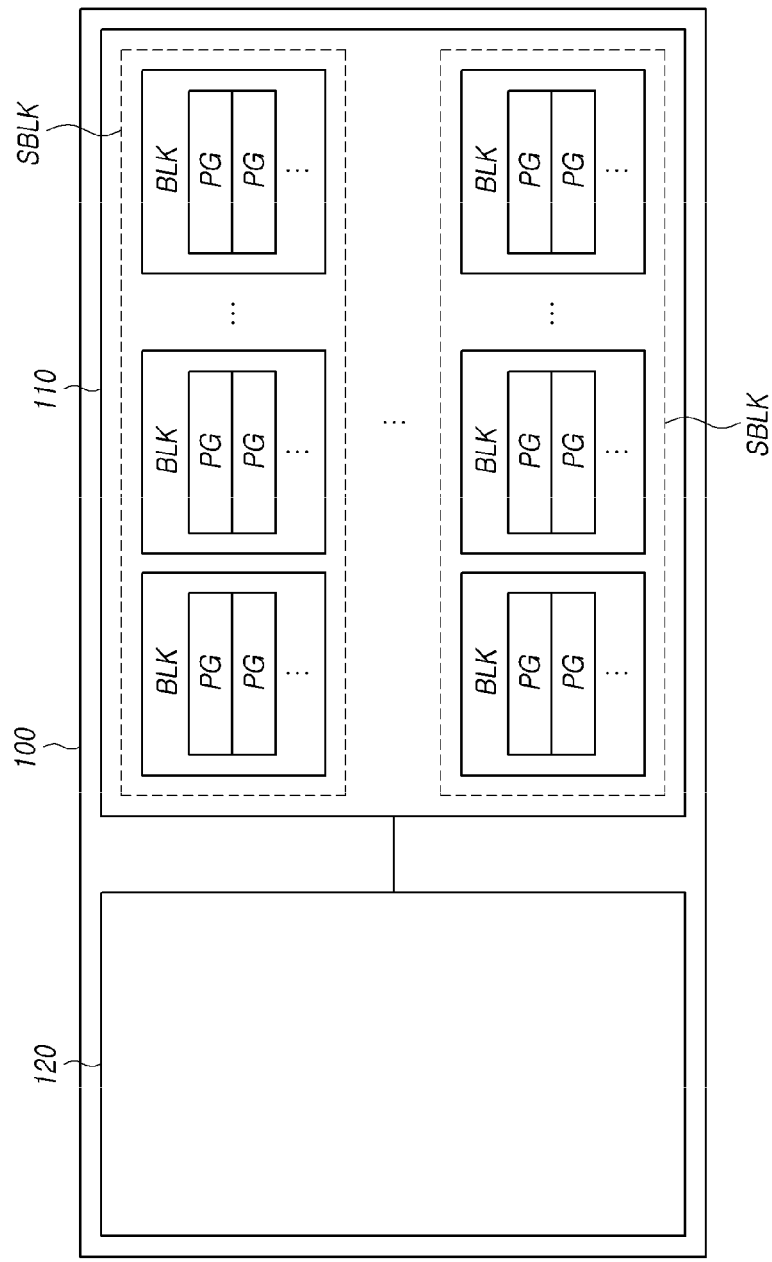
FIG. 4 schematically illustrates an example operation of the memory system according to embodiments of the present disclosure.

FIG. 4 schematically illustrates an example operation of the memory system 100 according to embodiments of the present disclosure.

Referring to FIG. 4, the memory system 100 may include the memory device 110 and the memory controller 120.

The memory device 110 may include a plurality of memory blocks BLK. In this case, each of the plurality of memory blocks BLK may include a plurality of pages PG.

The memory controller 120 may control the operation of the memory device 110. First, the memory controller 120 may determine a plurality of super memory blocks SBLK. Each of the plurality of super memory blocks SBLK may include two or more of the plurality of memory blocks BLK.

The memory controller 120 may select a victim block for garbage collection from among the plurality of super memory blocks SBLK. In an embodiment, a subsequent garbage collection operation migrates all valid pages in the selected super memory block to one or more other super memory blocks, and then erases all the memory blocks in the selected super memory block.

Meanwhile, the memory controller 120 may communicate with a plurality of memory blocks BLK included in the memory device 110 through a plurality of channels and a plurality of ways. Hereinafter, this will be described in detail with reference to FIG. 5.

Figure 5:
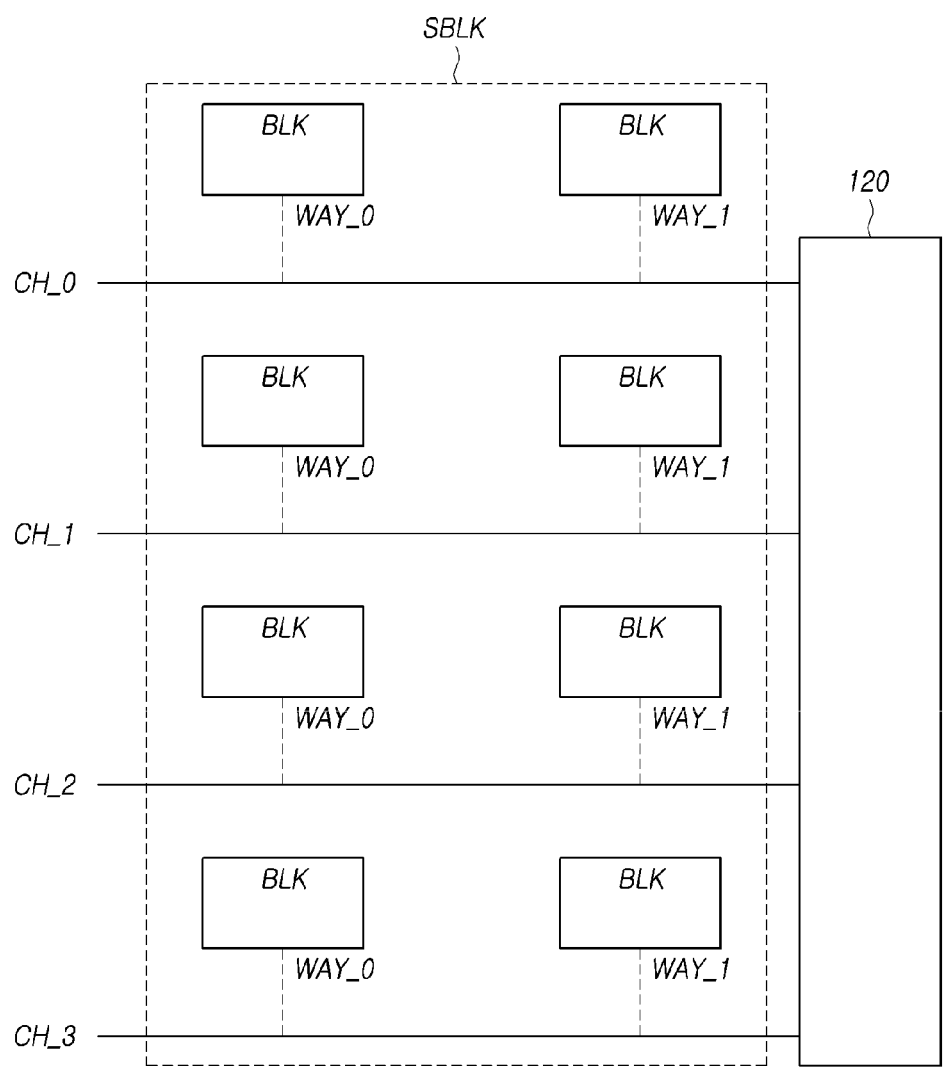
FIG. 5 illustrates an example of the structure of a super memory block according to embodiments of the present disclosure.

FIG. 5 illustrates an example of the structure of a super memory block SBLK according to embodiments of the present disclosure.

Referring to FIG. 5, the memory blocks BLK included in the super memory block SBLK may respectively correspond to one of the plurality of ways WAY and one of the plurality of channels CH. The memory blocks BLK included in the super memory block SBLK may communicate with the memory controller 120 through a corresponding way WAY and channel CH. Meanwhile, the memory blocks BLK included in the super memory block SBLK may respectively be directly connected to the corresponding way WAY and channel CH or indirectly connected to the corresponding way WAY and channel CH via other modules.

For example, the memory device 110 may include a plurality of memory dies (not shown), and memory blocks BLK included in a memory die may share one of the plurality of channels CH or one of a plurality of ways WAY. In addition, a memory die may include a plurality of planes, and memory blocks BLK included in the memory die may be located on different planes.

In this case, the memory blocks sharing the same channel may sequentially communicate data or commands with the memory controller 120 instead of communicating data or command with the memory controller 120 in parallel.

Meanwhile, memory blocks sharing the same channel may simultaneously execute respective read, write, or erase operations. Executing a read, write, or erase operation of memory blocks sharing the same channel and corresponding to different ways simultaneously may be referred to as executing an interleave operation.

Referring to FIG. 5, the memory blocks BLK included in the super memory block SBLK correspond to way WAY_0 or way WAY_1, respectively. In FIG. 5, a case in which two ways WAY_0, WAY_1 exist is described as an example, but the number of ways corresponding to one or more of the memory blocks BLK included in the super memory block SBLK is not limited to 2, but may be more or less than 2.

And, the memory blocks BLK included in the super memory block SBLK may correspond to channel CH_0, channel CH_1, channel CH_2, or channel CH_3, respectively. In FIG. 5, a case in which four channels CH_0, CH_1, CH_2, and CH_3 exist is described as an example, but the number of channels corresponding to one or more of the memory blocks BLK included in the super memory block SBLK is not limited to 4, but may be more or less than 4.

Figure 6:
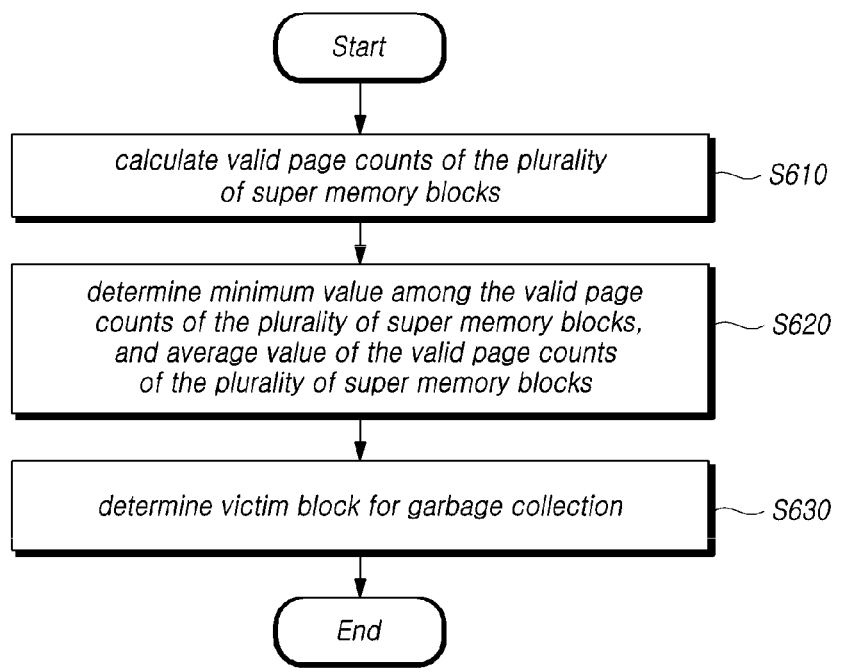
FIG. 6 is a flowchart illustrating an operation of the memory system according to embodiments of the present disclosure.

FIG. 6 is a flowchart illustrating an operation of the memory system 100 according to embodiments of the present disclosure.

Referring to FIG. 6, the memory controller 120 of the memory system 100 may calculate valid page counts of each of the plurality of super memory blocks SBLK (S610).

The valid page count of a super memory block SBLK indicates the number of pages in which valid data is stored among pages included in that super memory block SBLK.

The memory controller 120 may determine a minimum value among the valid page counts of the plurality of super memory blocks SBLK, and an average value of the valid page counts of the plurality of super memory blocks SBLK (S620).

The memory controller 120 may then select a victim block for garbage collection from among the plurality of super memory blocks SBLK, based on the minimum value among the valid page counts of the plurality of super memory blocks SBLK and the average value of the valid page counts of the plurality of super memory blocks SBLK (S630). In this case, the victim block is one of the plurality of super memory blocks SBLK.

Hereinafter, an example of an operation in which the memory controller 120 of the memory system 100 determines the victim block for garbage collection in operation S630 will be described with reference to FIG. 7.

Figure 7:
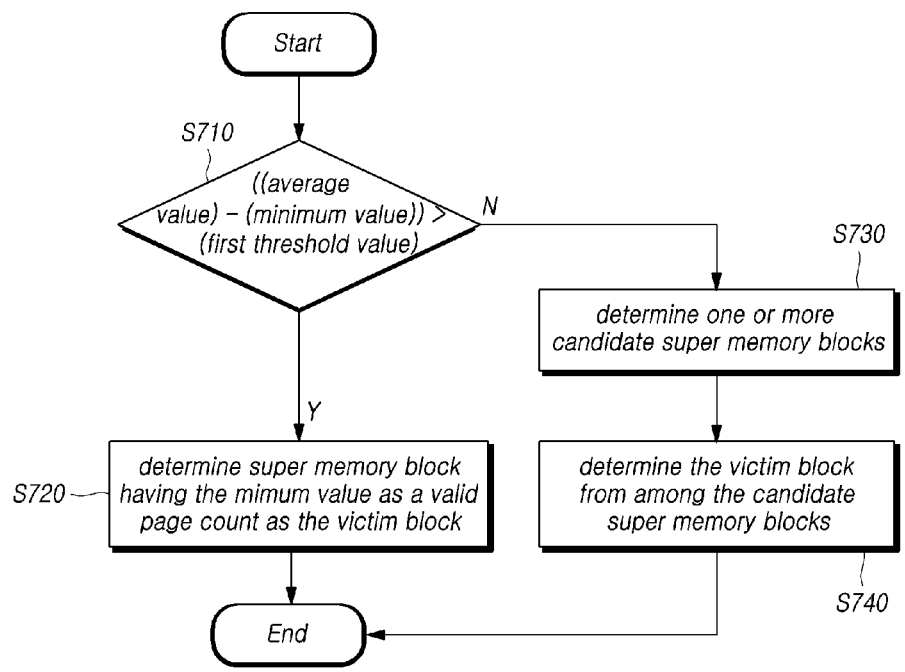
FIG. 7 is a flowchart illustrating an example of an operation in which the memory system determines the victim block according to embodiments of the present disclosure.

FIG. 7 is a flowchart illustrating an example of an operation in which the memory system 100 determines the victim block according to embodiments of the present disclosure.

Referring to FIG. 7, the memory controller 120 of the memory system 100 determines whether a difference between the minimum value among the valid page counts of the plurality of super memory blocks SBLK and the average value of the valid page counts of the plurality of super memory blocks SBLK is greater than a first threshold value (S710).

When the difference between the minimum value and the average value is greater than the first threshold value (S710—Y), the memory controller 120 may select a super memory block having a valid page count equal to the minimum value as the victim block (S720).

On the other hand, when the difference between the minimum value and the average value is less than or equal to the first threshold value (S710—N), the memory controller 120 may determine one or more candidate super memory blocks from among the plurality of super memory blocks (S730). The memory controller 120 may then select the victim block from among the candidate super memory blocks (S740).

When difference between the minimum value and the average value is not large, the memory controller 120 may determine that the advantage generated by selecting the super memory block having a valid page count equal to the minimum value as the victim block is not big, and may select the victim block in consideration of other factors.

For example, the memory controller 120 may select the victim block in consideration of valid pages that are consecutive in each of the plurality of super memory blocks SBLK. This is because a super memory block with many consecutive valid pages may take less time to read data.

However, in order to consider consecutive valid pages, the memory controller 120 needs to analyze the distribution of valid pages on each of the plurality of super memory blocks SBLK, which may cause overhead. Accordingly, a technology for minimizing such overhead and determining the victim block more efficiently will be described in the embodiments of the present disclosure.

Figure 8:
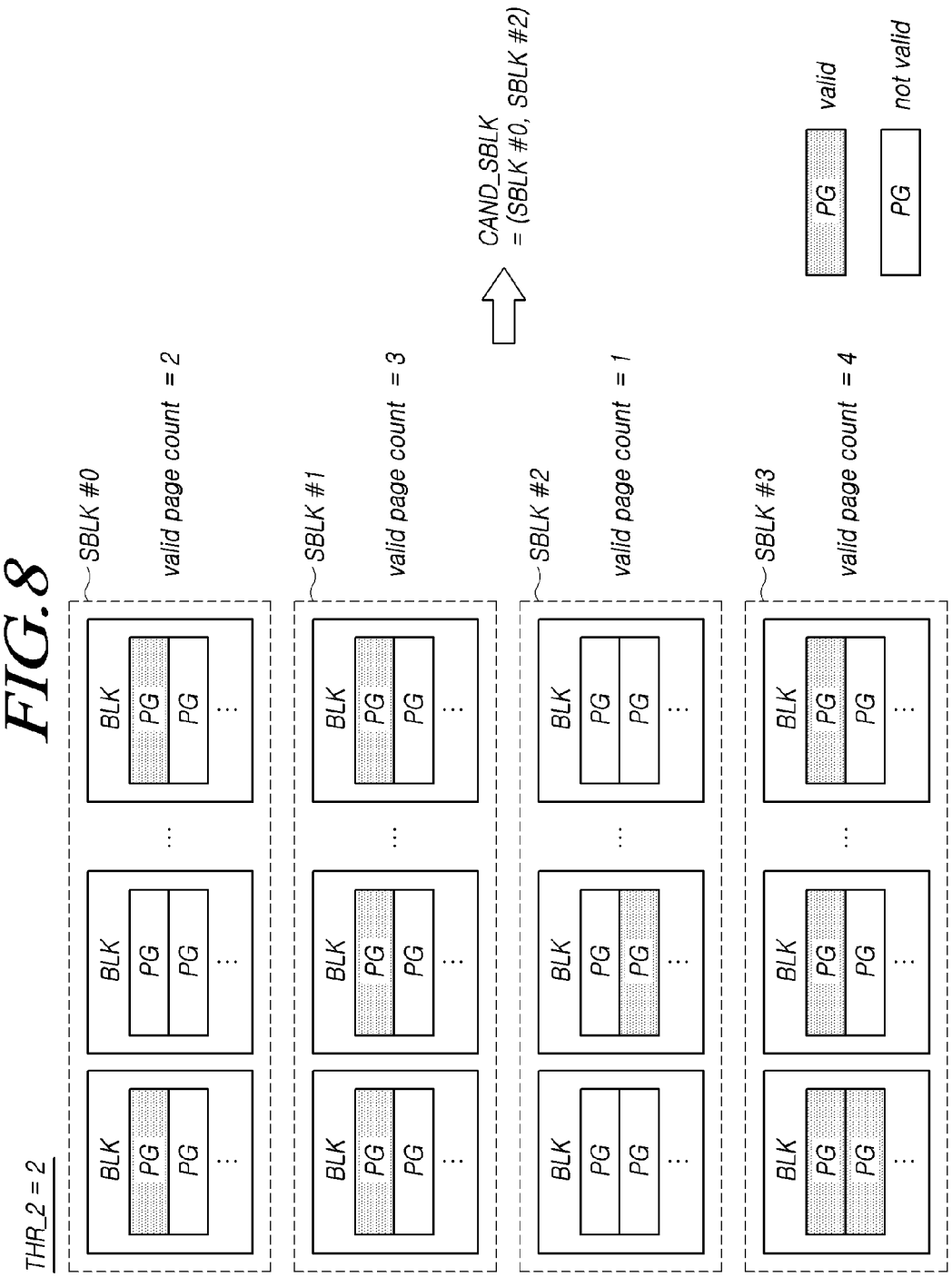
FIG. 8 illustrates an example of an operation in which the memory system determines candidate super memory blocks according to embodiments of the present disclosure.

FIG. 8 illustrates an example of an operation in which the memory system 100 determines candidate super memory blocks according to embodiments of the present disclosure.

Referring to FIG. 8, the memory controller 120 of the memory system 100 may determine one or more super memory blocks having a valid page count equal to or less than a second threshold value among the plurality of super memory blocks SBLK as the candidate super memory blocks CAND_SBLK. That is, among the plurality of super memory blocks SBLK, super memory blocks having a valid page count less than or equal to a certain value may be selected as the victim block even though they do not have the minimum valid page count.

In FIG. 8, the second threshold value THR_2 is 2. The valid page count of the super memory block SBLK #0 is 2, the valid page count of the super memory block SBLK #1 is 3, the valid page count of the super memory block SBLK #2 is 1, the valid page count of the super memory block SBLK #3 is 4.

The memory controller 120 may select the super memory block SBLK #0 and the super memory block SBLK #2, having valid page count equal to or less than the second threshold value THR_2, as the candidate super memory blocks CAND_SBLK.

Then, as described below, the memory controller 120 may in some cases select the super memory block SBLK #0 as the victim block instead of the super memory block SBLK #2 having the minimum valid page count.

Figure 9:
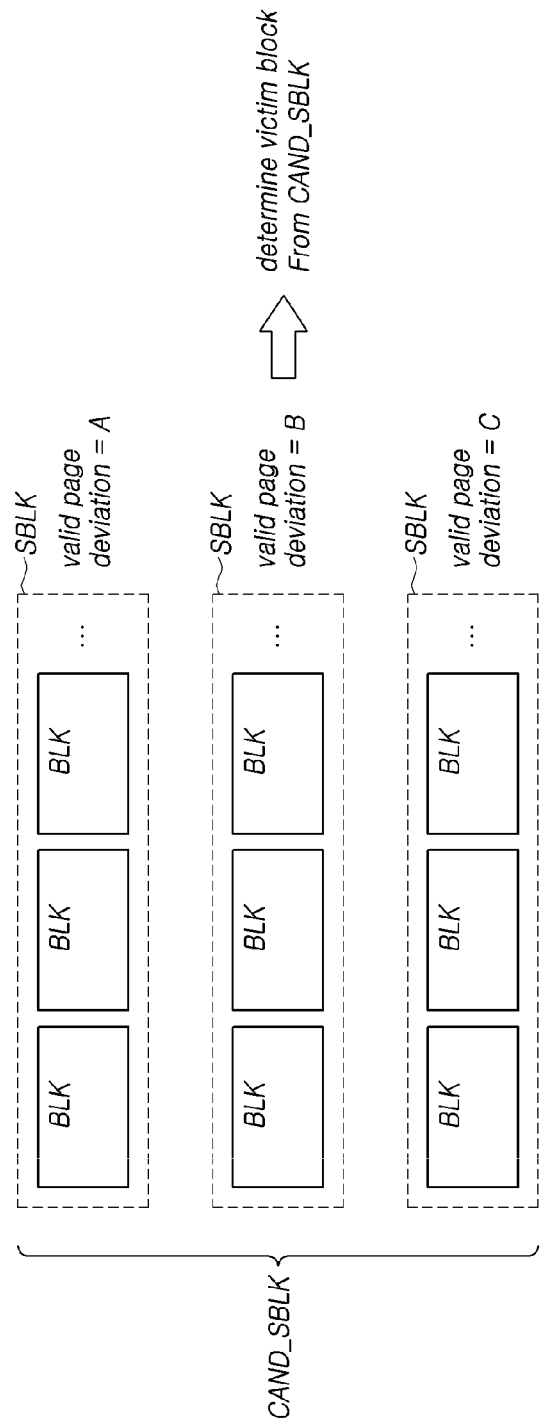
FIG. 9 illustrates an example of an operation in which the memory system selects the victim block from among the candidate super memory blocks according to embodiments of the present disclosure.

FIG. 9 illustrates an example of an operation in which the memory system 100 selects the victim block from among the candidate super memory blocks CAND_SBLK according to embodiments of the present disclosure.

Referring to FIG. 9, the memory controller 120 of the memory system 100 may determine a valid page deviation for each of the candidate super memory blocks CAND_SBLK.

Valid page deviation of candidate super memory block CAND_SBLK may be defined as a standard deviation of valid page counts of a plurality of memory block groups included in the corresponding candidate super memory block CAND_SBLK. Accordingly, the valid page deviation for candidate super memory block CAND_SBLK may vary according to how a plurality of memory block groups included in the corresponding candidate super memory block CAND_SBLK are determined. In another embodiment, the valid page deviation may be defined as the variance (that is, as the square of the standard deviation) of valid page counts of a plurality of memory block groups included in the corresponding candidate super memory block CAND_SBLK. Standard deviation and variance are both measure of dispersion within a set of values; accordingly, the valid page deviation is a measure of the dispersion of the valid page counts of the plurality of memory block groups.

The memory controller 120 may determine the victim block based on the valid page deviation for each of the candidate super memory blocks CAND_SBLK. In FIG. 9, the valid page deviations of the candidate super memory blocks CAND_SBLKS are A, B, and C, respectively. The memory controller 120 may determine the victim block from among the candidate super memory blocks based on A, B, and C. When determining the victim block, the memory controller 120 may calculate only the valid page deviation for each of the candidate super memory blocks without separately analyzing the distribution of valid pages on the candidate super memory blocks. Through this, the memory controller 120 may minimize the overhead incurred in the process of determining the victim block and determine the victim block more efficiently.

Hereinafter, an operation in which the memory controller 120 of the memory system 100 determines a valid page deviation for each of the candidate super memory blocks and selects the victim block based thereon will be described.

Figure 10:
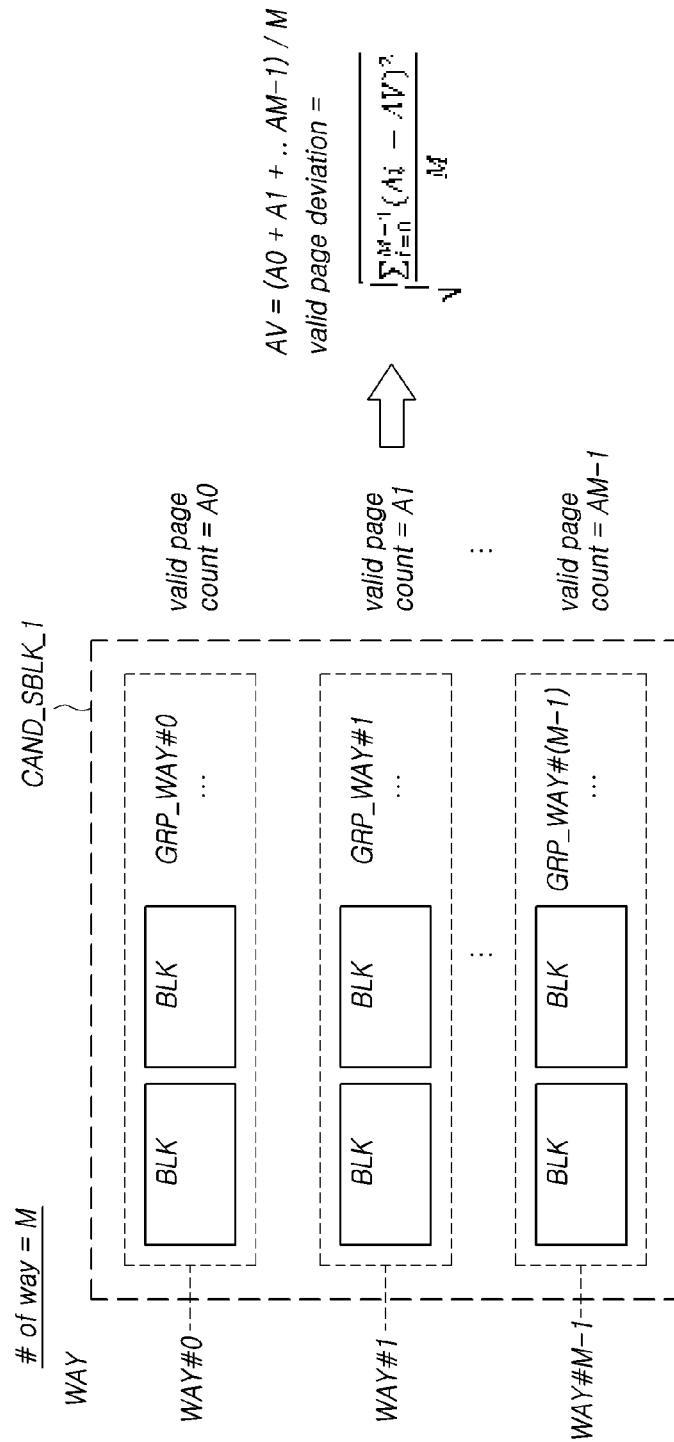
FIG. 10 illustrates an example of an operation in which the memory system determines a valid page deviation for a first candidate super memory block according to embodiments of the present disclosure.

FIG. 10 illustrates an example of an operation in which the memory system 100 determines a valid page deviation for a first candidate super memory block CAND_SBLK_1 according to embodiments of the present disclosure.

Referring to FIG. 10, the memory controller 120 of the memory system 100 may group memory blocks BLK included in the first candidate super memory block CAND_SBLK_1, which is one of the aforementioned candidate super memory blocks, so that memory blocks corresponding to the same way WAY are grouped into the same memory block group. That is, the memory controller 120 may determine a plurality of memory block groups in the first candidate super memory block CAND_SBLK_1 so that memory blocks corresponding to the same way WAY are grouped into the same memory block group. In another embodiment, the memory controller 120 may determine a plurality of memory block groups in the first candidate super memory block CAND_SBLK_1 so that each memory block group includes only memory blocks corresponding to a respective way WAY, but the memory blocks corresponding to each way WAY may be distributed among two or more memory block groups.

In FIG. 10, it is assumed that the memory blocks BLK included in the first candidate super memory block CAND_SBLK_1 correspond to one of M ways WAY (M is a number equal to or greater than 2).

In this case, memory blocks BLK corresponding to way WAY #0 are grouped together, and memory blocks BLK corresponding to way WAY #1 are grouped together. In the same way, the memory blocks BLK corresponding to the way WAY #M−1 may be grouped together.

The valid page count of the group GRP_WAY #0 of the memory blocks BLK corresponding to the way WAY #0 is A0, the valid page count of the group GRP_WAY #1 of the memory blocks BLK corresponding to the way WAY #1 is A1, and in the same way, the valid page count of the group GRP_WAY #M−1 of the memory blocks BLK corresponding to the way WAY #M−1 is AM−1.

In this case, the average of valid page counts for the M memory block groups GRP_WAY #0, GRP_WAY #1, ~, GRP_WAY #M−1 is $AV=(A0+A1+\sim+AM-1)/M$.

The standard deviation of valid page counts for the M memory block groups GRP_WAY #0, GRP_WAY #1, ~, GRP_WAY #M−1 is $$\sqrt{\frac{\sum_{i=0}^{M-1}(Ai-AV)^2}{M}}.$$

In an embodiment wherein the variance is used as the valid page deviation instead, the variance of valid page counts for the M memory block groups GRP_WAY #0, GRP_WAY #1, ~, GRP_WAY #M−1 is $$\frac{\sum_{i=0}^{M-1}(Ai-AV)^2}{M}.$$

The memory controller 120 may determine the aforementioned standard deviation (or, in another embodiment, the aforementioned variance) as a valid page deviation with respect to the first candidate super memory block CAND_SBLK_1.

Figure 11:
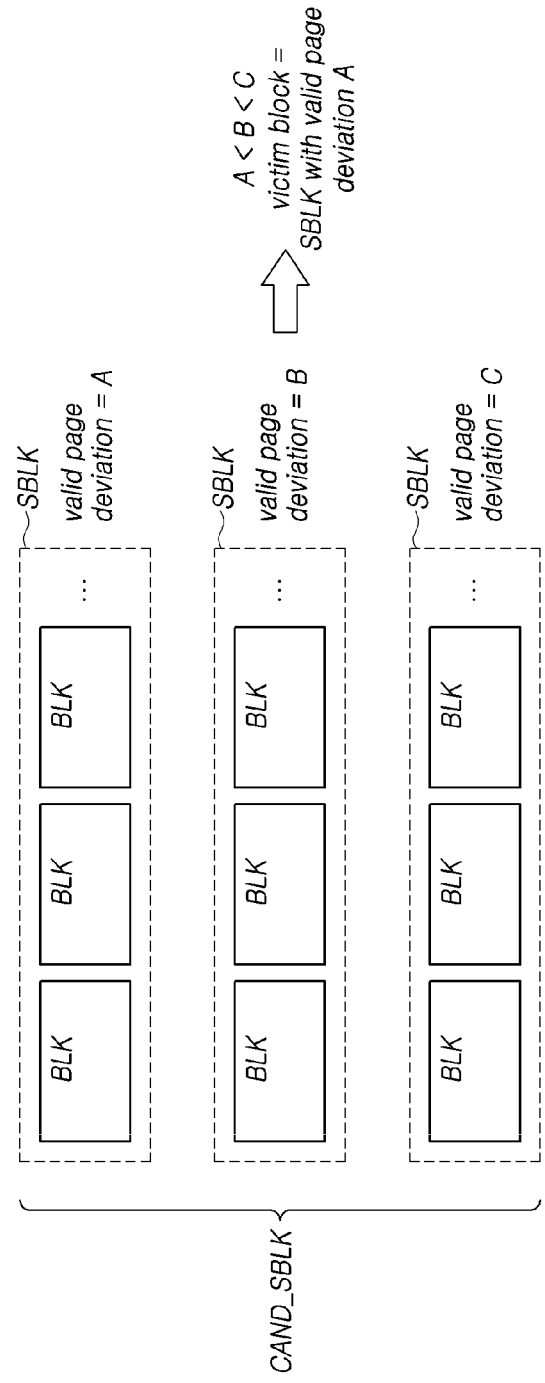
FIG. 11 illustrates an example of an operation in which the memory system selects the victim block based on the valid page deviation for each of the candidate super memory blocks according to embodiments of the present disclosure.

FIG. 11 illustrates an example of an operation in which the memory system 100 selects the victim block based on the valid page deviation for each of the candidate super memory blocks CAND_SBLK according to embodiments of the present disclosure.

In FIG. 11, valid page deviations for the candidate super memory blocks CAND_SBLK are A, B, and C, respectively, and A<B<C. That is, the minimum value of the valid page deviations for the candidate super memory blocks CAND_SBLK is A.

Accordingly, the memory controller 120 of the memory system 100 may select the candidate super memory block having a valid page deviation equal to the minimum value A as the victim block.

Figure 12:
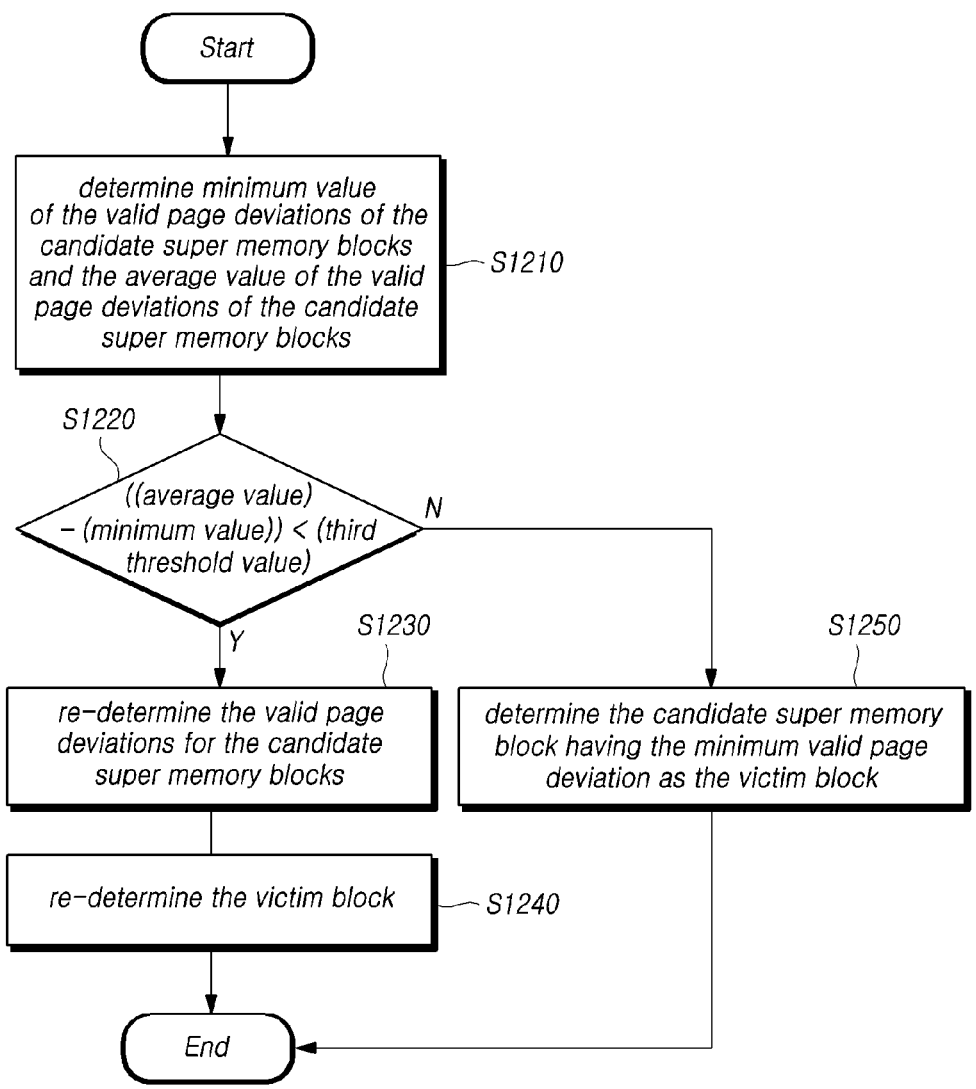
FIG. 12 is a flowchart illustrating an operation in which the memory system determines whether to re-determine the victim block according to embodiments of the present disclosure.

FIG. 12 illustrates a flowchart illustrating an operation in which the memory system 100 determines whether to re-determine the victim block according to embodiments of the present disclosure.

Referring to FIG. 12, the memory controller 120 of the memory system 100 may determine the minimum value of the valid page deviations of the candidate super memory blocks CAND_SBLK and the average value of the valid page deviations of the candidate super memory blocks CAND_SBLK (S1210). In this case, the minimum value of the valid page deviations of the candidate super memory blocks CAND_SBLK and the average value of the valid page deviations of the candidate super memory blocks CAND_SBLK may be determined in the manner described with reference to FIGS. 9 to 10.

The memory controller 120 may determine whether a difference between the minimum value of valid page deviations of the candidate super memory blocks CAND_SBLK and the average value of valid page deviations of the candidate super memory blocks CAND_SBLK, which is determined in the operation S1210, is less than a third threshold value (S1220).

When the difference between the minimum value of valid page deviations of the candidate super memory blocks CAND_SBLK and the average value of valid page deviations of the candidate super memory blocks CAND_SBLK is less than the third threshold value (S1220—Y), the memory controller 120 may re-determine the valid page deviations for the candidate super memory blocks CAND_SBLK (S1230).

That is, the memory controller 120 determines that the already calculated valid page deviations of the candidate super memory blocks CAND_SBLK are not suitable for determining the victim block, and re-determines the valid page deviations for the candidate super memory blocks CAND_SBLK, as described below.

The memory controller 120 may re-determine the victim block based on the re-determined valid page deviations for the candidate super memory blocks (S1240).

On the other hands, when difference between the minimum value of valid page deviations of the candidate super memory blocks CAND_SBLK and the average value of valid page deviations of the candidate super memory blocks CAND_SBLK is greater than or equal to the third threshold value (S1220—Y), the memory controller 120 may determine the candidate super memory block having the minimum valid page deviation as the victim block, similarly to as described with reference to FIG. 11 (S1250).

As described above, the valid page deviations for the candidate super memory blocks CAND_SBLK may vary according to how a plurality of memory block groups included in each of the candidate super memory blocks CAND_SBLK are determined. Accordingly, the memory controller 120 of the memory system 100 may re-determine the valid page deviations for the candidate super memory blocks CAND_SBLK by determining the plurality of memory block groups included in each of the candidate super memory blocks CAND_SBLK in a different way. Hereinafter, this will be described in detail.

Figure 13:
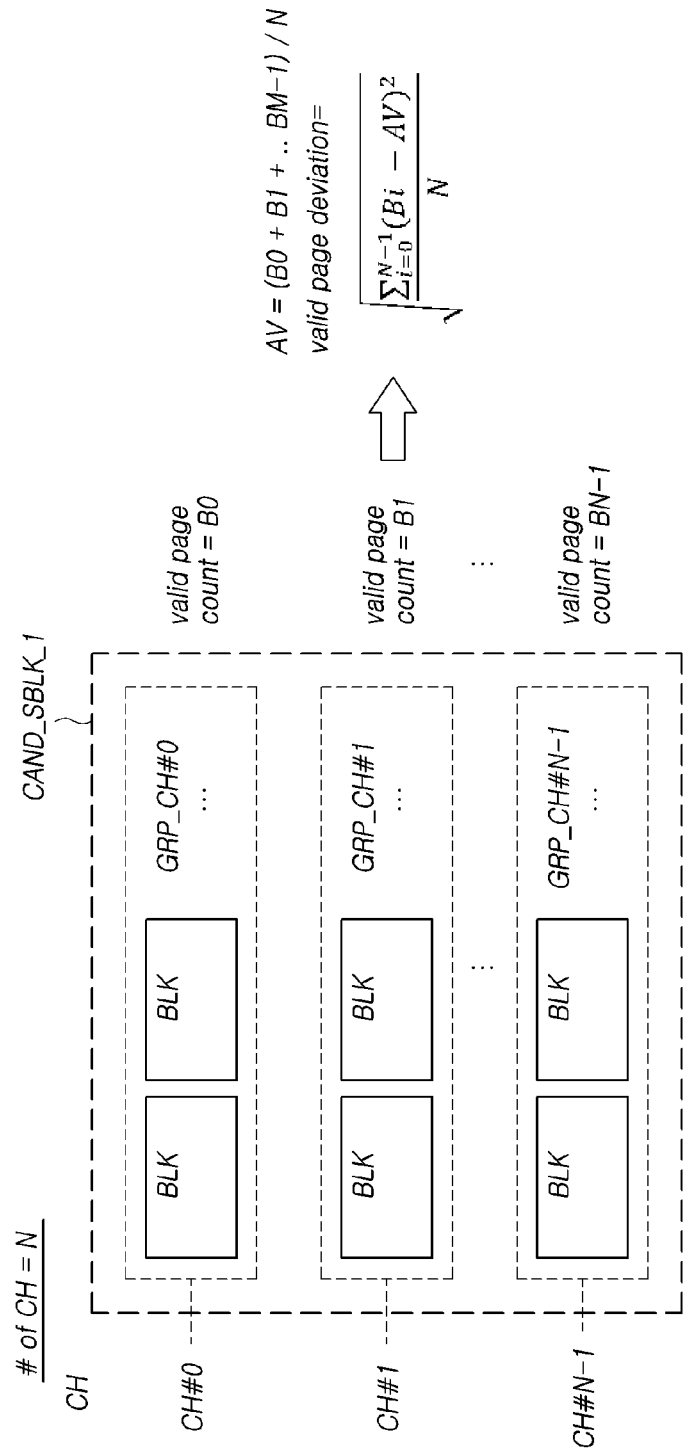
FIG. 13 illustrates an example of an operation in which the memory system re-determines a valid page deviation for the first candidate super memory block according to embodiments of the present disclosure.

FIG. 13 illustrates an example of an operation in which the memory system 100 re-determines a valid page deviation for the first candidate super memory block CAND_SBLK_1 according to embodiments of the present disclosure.

Referring to FIG. 13, the memory controller 120 of the memory system 100 may group the memory blocks BLK included in the first candidate super memory block CAND_SBLK_1 into the same memory block group with memory blocks corresponding to the same channel CH.

That is, the memory controller 120 may determine the plurality of memory block groups included in the first candidate super memory block CAND_SBLK_1 so that memory blocks corresponding to the same channel CH are grouped into the same memory block group. In another embodiment, the memory controller 120 may determine the plurality of memory block groups in the first candidate super memory block CAND_SBLK_1 so that each memory block group includes only memory blocks corresponding to a respective channel CH, but the memory blocks corresponding to each channel CH may be distributed among two or more memory block groups.

In FIG. 13, the memory blocks BLK included in the first candidate super memory block CAND_SBLK_1 correspond to one of N (N is a number equal to or greater than 2) channels CH.

In this case, memory blocks BLK corresponding to channel CH #0 are grouped together, and memory blocks BLK corresponding to channel CH #1 are grouped together. Also, in the same way, memory blocks BLK corresponding to channel CH #N−1 may be grouped together.

In this case, it is assumed that the valid page count of the group GRP_CH #0 of the memory blocks BLK corresponding to the channel CH #0 is B0, the valid page count of the group GRP_CH #1 of the memory blocks BLK corresponding to the channel CH #1 is B1, and, in the same way, the valid page count of the group GRP_CH #N−1 of the memory blocks BLK corresponding to the channel CH #N−1 is BN−1.

In this case, the average of valid page counts for N memory block groups GRP_CH #0, GRP_CH #1, ~, GRP_CH #N−1 is AV=(B0+B1+ . . . +BN−1)/N.

And the standard deviation of valid page counts for N memory block groups GRP_CH #0, GRP_CH #1, —, GRP_CH #N−1 is $$\sqrt{\frac{\sum_{i=0}^{N-1}(Bi-AV)^2}{N}}.$$

In an embodiment wherein the variance is used as the valid page deviation instead, the variance of valid page counts for N memory block groups GRP_CH #0, GRP_CH #1, ~, GRP_CH #N−1 is $$\frac{\sum_{i=0}^{N-1}(Bi-AV)^2}{N}.$$

The memory controller 120 may determine the aforementioned standard deviation (or, in another embodiment, the aforementioned variance) as a valid page deviation with respect to the first candidate super memory block CAND_SBLK_1.

Figure 14:
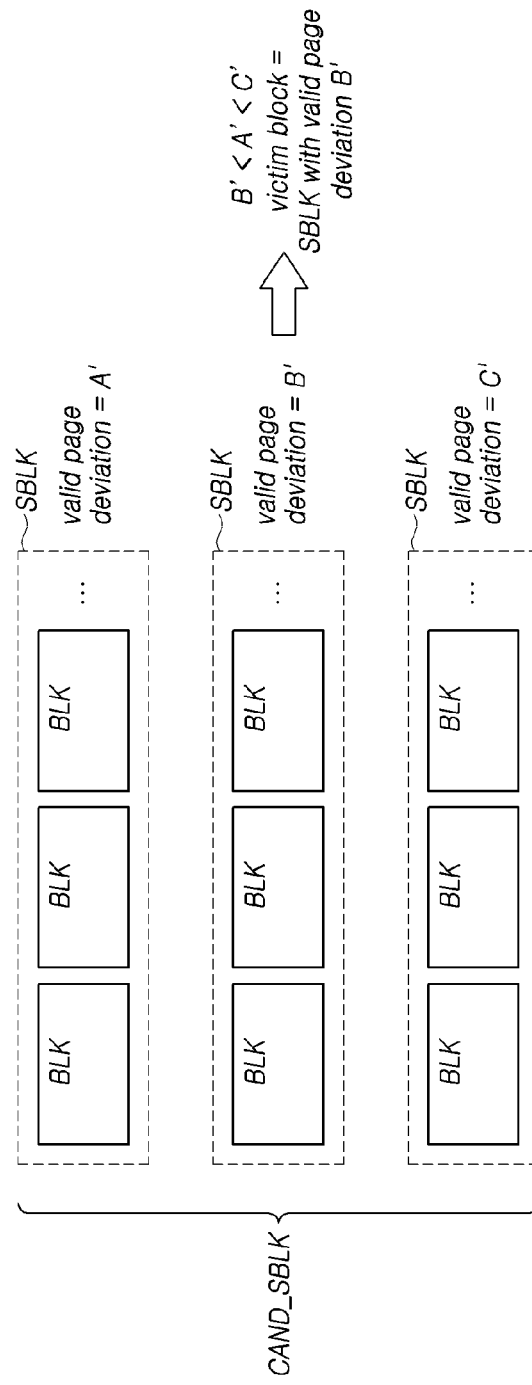
FIG. 14 illustrates another example of an operation in which the memory system selects the victim block based on the re-determined valid page deviation for each of the candidate super memory blocks according to embodiments of the present disclosure.

FIG. 14 illustrates another example of an operation in which the memory system 100 determines the victim block based on the valid page deviation for each of the candidate super memory blocks CAND_SBLK according to embodiments of the present disclosure.

In FIG. 14, the valid page deviations for the candidate super memory blocks are A', B', C', respectively, and B'<A'<C'. That is, the minimum value of the valid page deviations for the candidate super memory blocks CAND_SBLK is B'.

Accordingly, the memory controller 120 of the memory system 100 may select the candidate super memory block having B' as the valid page deviation as the victim block.

Figure 15:
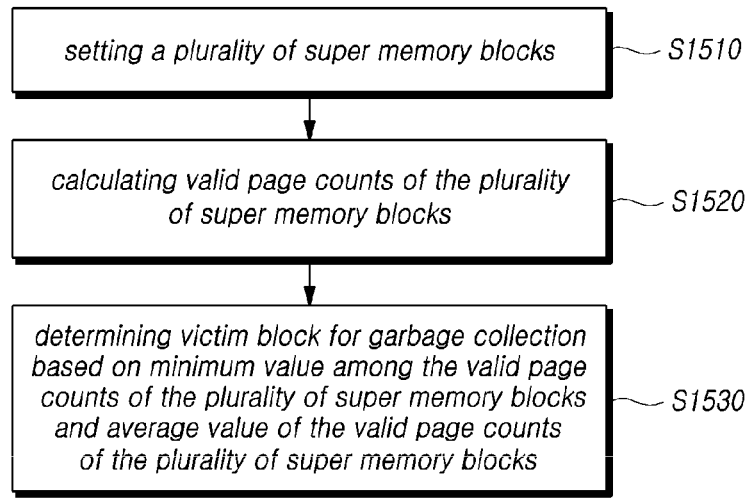
FIG. 15 illustrates a process for operating a memory system according to embodiments of the present disclosure.

FIG. 15 illustrates a process for operating the memory system 100 according to embodiments of the present disclosure.

Referring to FIG. 15, the operation of the memory system 100 may include determining a plurality of super memory blocks SBLK (S1510). Each of the super memory blocks SBLK may include two or more of the plurality of memory blocks BLK. Each of the plurality of memory blocks BLK may include a plurality of pages PG.

And the operation of the memory system 100 may include calculating valid page counts of the plurality of super memory blocks SBLK (S1520).

And the operation of the memory system 100 may include determining victim block for garbage collection from among the plurality of super memory blocks SBLK, based on minimum value among the valid page counts of the plurality of super memory blocks SBLK and average value of the valid page counts of the plurality of super memory blocks SBLK (S1530).

For example, the operation S1530 may determine a super memory block having the minimum value as a valid page count as the victim block when difference between the minimum value and the average value is greater than a first threshold value, and determine one or more candidate super memory blocks from among the plurality of super memory blocks and determine the victim block from among the candidate super memory blocks when difference between the minimum value and the average value is less than or equal to the first threshold value.

In this case, the candidate super memory blocks may be determined as one or more super memory blocks having a valid page count equal to or less than a second threshold value among the plurality of super memory blocks.

The operation S1530 may include determining valid page deviations for the candidate super memory blocks, and determining the victim block based on the valid page deviations for the candidate super memory blocks. In this case, the valid page deviation for each of the candidate super memory blocks is a standard deviation (or, in other embodiments, a variance) of valid page counts of a plurality of memory block groups included in each of the candidate super memory blocks.

For example, the determining the valid page deviations for the candidate super memory blocks may include determining a plurality of memory block groups included in the candidate super memory blocks so that memory blocks corresponding to the same way are grouped into the same memory block group. A candidate super memory block having a minimum valid page deviation among the candidate super memory blocks may then be selected as the victim block.

Meanwhile, the operation S1530 may further include re-determining the valid page deviations for candidate super memory blocks when difference between the minimum value of valid page deviations of the candidate super memory blocks and the average value of valid page deviations of the candidate super memory blocks is less than a third threshold value, and selecting the victim block based on the re-determined valid page deviations for the candidate super memory blocks.

For example, the re-determining the valid page deviation for each of the candidate super memory blocks may determine the plurality of memory block groups included in the candidate super memory blocks so that memory blocks corresponding to the same channel are grouped into the same memory block group.

Figure 16:
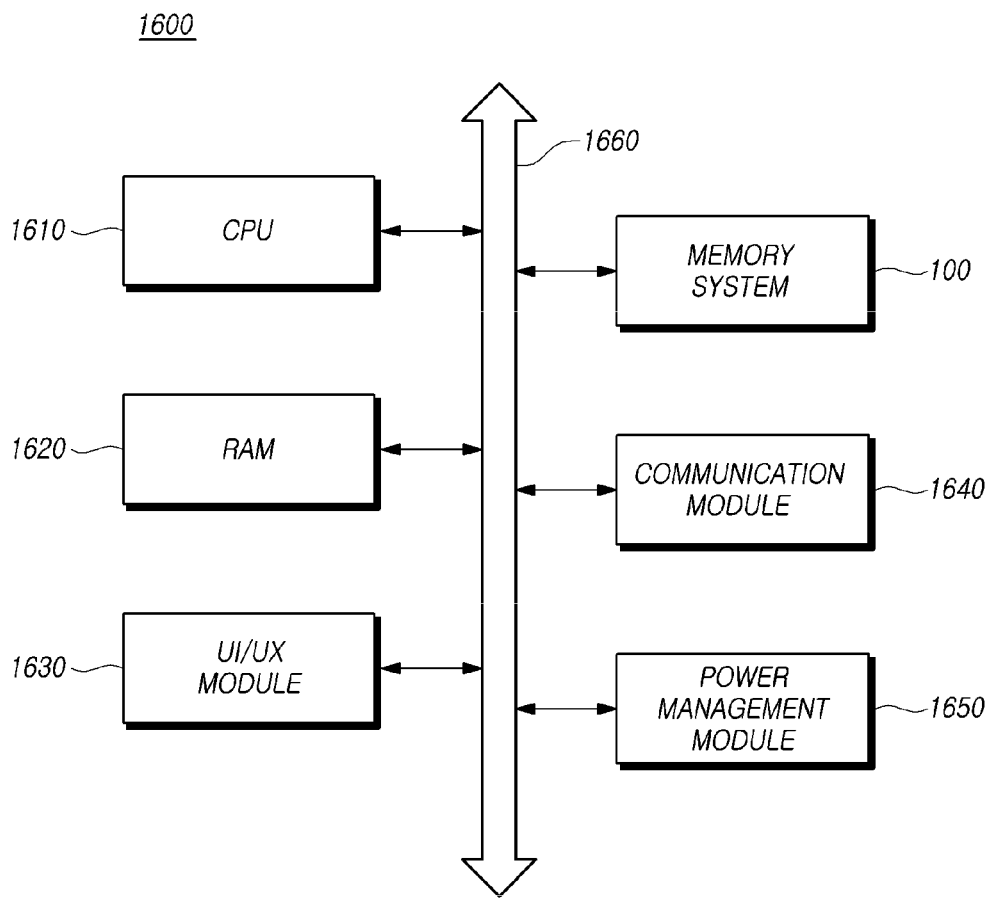
FIG. 16 is a diagram illustrating the configuration of a computing system based on some embodiments of the disclosed technology.

FIG. 16 is a diagram illustrating the configuration of a computing system 1600 based on an embodiment of the disclosed technology.

Referring to FIG. 16, the computing system 1600 based on an embodiment of the disclosed technology may include: a memory system 100 electrically connected to a system bus 1660; a CPU 1610 configured to control the overall operation of the computing system 1600; a RAM 1620 configured to store data and information related to operations of the computing system 1600; a user interface/user experience (UI/UX) module 1630 configured to provide the user with a user environment; a communication module 1640 configured to communicate with an external device as a wired and/or wireless type; and a power management module 1650 configured to manage power used by the computing system 1600.

The computing system 1600 may be a personal computer (PC) or may include a mobile terminal such as a smartphone, a tablet or various electronic devices.

The computing system 1600 may further include a battery for supplying an operating voltage, and may further include an application chipset, a graphic-related module, a camera image processor, and a DRAM. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:
1. A memory system comprising:
a memory device including a plurality of memory blocks each including a plurality of pages; and
a memory controller configured to:
determine a plurality of super memory blocks each including two or more of the plurality of memory blocks,
calculate valid page counts of the plurality of super memory blocks, and
determine a victim block for garbage collection from among the plurality of super memory blocks, based on a minimum value among the valid page counts of the plurality of super memory blocks and an average value of the valid page counts of the plurality of super memory blocks,
wherein the memory controller is configured to:
when a difference between the minimum value and the average value is greater than a first threshold value, select a super memory block having a valid page count equal to the minimum value as the victim block, and
when the difference between the minimum value and the average value is less than or equal to the first threshold value:
determine one or more candidate super memory blocks from among the plurality of super memory blocks, and
determine the victim block from among the candidate super memory blocks.

2. The memory system of claim 1, wherein the memory controller is configured to:
determine one or more super memory blocks having a valid page count equal to or less than a second threshold value among the plurality of super memory blocks as the candidate super memory blocks.

3. The memory system of claim 1, wherein the memory controller is configured to:
determine valid page deviations for the candidate super memory blocks, and
determine the victim block based on the valid page deviations for the candidate super memory blocks,
wherein the valid page deviation for each of the candidate super memory blocks corresponds to a standard deviation or variance of valid page counts of a plurality of memory block groups included in that candidate super memory block.

4. The memory system of claim 1, wherein the memory controller is configured to:
determine a first plurality of memory block groups included in the candidate super memory blocks so that memory blocks grouped into each memory block group correspond to a same way.

5. The memory system of claim 4, wherein the memory controller is configured to:
select a candidate super memory block having a valid page deviation equal to a minimum value of valid page deviations of the candidate super memory blocks as the victim block.

6. The memory system of claim 4, wherein the memory controller is configured to:
when a difference between the minimum value of valid page deviations of the candidate super memory blocks and an average value of valid page deviations of the candidate super memory blocks is less than a third threshold value:
re-determine the valid page deviations for the candidate super memory blocks, and
determine the victim block based on the re-determined valid page deviations for the candidate super memory blocks.

7. The memory system of claim 6, wherein the memory controller is configured to re-determine the valid page deviations for the candidate super memory blocks by:
determining a second plurality of memory block groups included in the candidate super memory blocks so that memory blocks grouped into each memory block group correspond to a same channel; and determine, according to a standard deviation or variance of valid page counts of memory block groups in the second plurality of memory block groups, the valid page deviations for the candidate super memory blocks.

8. A memory controller comprising:

a memory interface capable of communicating with a memory device including a plurality of memory blocks each including a plurality of pages; and a control circuit configured to:
- determine a plurality of super memory blocks each including two or more of the plurality of memory blocks,
- calculate valid page counts of the plurality of super memory blocks, and
- determine a victim block for garbage collection from among the plurality of super memory blocks, based on a minimum value among the valid page counts of the plurality of super memory blocks and an average value of the valid page counts of the plurality of super memory blocks, wherein the control circuit is configured to:
- when a difference between the minimum value and the average value is greater than a first threshold value, determine a super memory block having a valid page count equal to the minimum value as the victim block, and
- when the difference between the minimum value and the average value is less than or equal to the first threshold value, determine one or more candidate super memory blocks from among the plurality of super memory blocks and determine the victim block from among the candidate super memory blocks.

9. The memory controller of claim 8, wherein the control circuit is configured to:
- determine valid page deviations for the candidate super memory blocks, and
- determine the victim block based on the valid page deviations for the candidate super memory blocks, wherein the valid page deviation for each of the candidate super memory blocks corresponds to a standard deviation or variance of valid page counts of a plurality of memory block groups included in that candidate super memory block.

10. An operating method of a memory system including a plurality of memory blocks, the operating method comprising:
- determining a plurality of super memory blocks each including two or more of the plurality of memory blocks;
- calculating valid page counts of the plurality of super memory blocks; and
- determining a victim block for garbage collection from among the plurality of super memory blocks, based on a minimum value among the valid page counts of the plurality of super memory blocks and an average value of the valid page counts of the plurality of super memory blocks, wherein determining the victim block comprises:
- when a difference between the minimum value and the average value is greater than a first threshold value, determining a super memory block having a valid page count equal to the minimum value as the victim block when a difference between the minimum value and the average value is greater than a first threshold value, and
- when the difference between the minimum value and the average value is less than or equal to the first threshold value, determining one or more candidate super memory blocks from among the plurality of super memory blocks and determining the victim block from among the candidate super memory blocks.

11. The operating method of claim 10, wherein the candidate super memory blocks are determined as one or more super memory blocks having a valid page count equal to or less than a second threshold value among the plurality of super memory blocks.

12. The operating method of claim 10, wherein determining the victim block comprises:
- determining valid page deviations for the candidate super memory blocks; and
- determining the victim block based on the valid page deviations for the candidate super memory blocks, wherein the valid page deviation for each of the candidate super memory blocks corresponds to a standard deviation or variance of valid page counts of a plurality of memory block groups included in that candidate super memory block.

13. The operating method of claim 12, wherein determining the valid page deviations for the candidate super memory blocks includes determining a first plurality of memory block groups included in the candidate super memory blocks so that memory blocks grouped into the same memory block group correspond to the same way.

14. The operating method of claim 13, wherein determining the victim block selecting as the victim block a candidate super memory block having a valid page deviation equal to a minimum value of valid page deviations of the candidate super memory blocks.

15. The operating method of claim 13, wherein determining the victim block based on the valid page deviations for the candidate super memory blocks comprises:
- when a difference between the minimum value of valid page deviations of the candidate super memory blocks and an average value of valid page deviations of the candidate super memory blocks is less than a third threshold value:
- re-determining the valid page deviations for the candidate super memory blocks; and
- determining the victim block based on the re-determined valid page deviations for the candidate super memory blocks.

16. The operating method of claim 15, wherein re-determining the valid page deviation for each of the candidate super memory blocks includes determining a second plurality of memory block groups included in the candidate super memory blocks so that memory blocks grouped into each memory block group corresponding to the same channel.

* * * * *